United States Patent
Yu et al.

(10) Patent No.: US 12,184,379 B2
(45) Date of Patent: Dec. 31, 2024

(54) BEAM SELECTION METHOD AND COMMUNICATION APPARATUS

(71) Applicant: Huawei Technologies Co., Ltd., Shenzhen (CN)

(72) Inventors: Xiaoyong Yu, Shanghai (CN); Zhilin Zhao, Shanghai (CN); Haiquan Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 17/793,311

(22) PCT Filed: Nov. 27, 2020

(86) PCT No.: PCT/CN2020/132444
§ 371 (c)(1),
(2) Date: Jul. 15, 2022

(87) PCT Pub. No.: WO2021/143365
PCT Pub. Date: Jul. 22, 2021

(65) Prior Publication Data
US 2023/0353219 A1    Nov. 2, 2023

(30) Foreign Application Priority Data

Jan. 19, 2020  (CN) .......................... 202010061359.5

(51) Int. Cl.
*H04B 7/06* (2006.01)
*H04B 17/318* (2015.01)

(52) U.S. Cl.
CPC ......... *H04B 7/0695* (2013.01); *H04B 17/328* (2023.05)

(58) Field of Classification Search
CPC .. H04B 7/0695; H04B 17/328; H04B 17/318; H04B 17/327; H04B 17/382;
(Continued)

(56) References Cited

U.S. PATENT DOCUMENTS 9,900,891 B1 *  2/2018  Islam ..................... H04B 7/088
10,574,565 B2 *  2/2020  Luo ........................ H04L 5/0094
(Continued)

FOREIGN PATENT DOCUMENTS

CN  103891161 A  6/2014
CN  109891926 A  6/2019
(Continued)

OTHER PUBLICATIONS

Apple, "Considerations on multi-panel and MPE in FR2", 3GPP TSG RAN WG1 #97, R1-1907343, Reno, NV, US, May 13-17, 2019, 6 pages.
(Continued)

*Primary Examiner* — Dominic E Rego
(74) *Attorney, Agent, or Firm* — Slater Matsil, LLP

(57) ABSTRACT

A beam selection method and a communication apparatus are provided, which relate to the field of communication technologies. The method includes: A terminal receives a downlink reference signal from a third beam of a network device on a first beam and a second beam; then, the terminal performs RSRP measurement and MPE measurement on the first beam and the second beam separately to obtain first RSRP, second RSRP, first back-off power, and second back-off power; and when a difference between the first RSRP and the first back-off power is greater than a difference between the second RSRP and the first back-off power, the terminal sends uplink data by using the first beam. In this technical solution, the terminal may select an uplink working beam with reference to the measured back-off power of the first beam and the measured back-off power of the second beam.

15 Claims, 6 Drawing Sheets

(58) Field of Classification Search
CPC ... H04W 72/04; H04W 72/54; H04W 72/046; H04W 72/542; Y02D 30/70
See application file for complete search history.

(56) References Cited

U.S. PATENT DOCUMENTS

| | | | | |
|---|---|---|---|---|
| 10,644,774 | B2* | 5/2020 | Athley | H04W 72/046 |
| 10,700,752 | B2* | 6/2020 | Jung | H04B 7/0695 |
| 10,700,760 | B1* | 6/2020 | Berliner | H04B 17/327 |
| 11,166,172 | B2* | 11/2021 | Venugopal | H04W 72/046 |
| 11,490,442 | B2* | 11/2022 | Cirik | H04W 72/0446 |
| 2014/0211656 | A1* | 7/2014 | Hu | H04B 17/318 370/252 |
| 2017/0214447 | A1* | 7/2017 | Li | H04B 17/327 |
| 2018/0103438 | A1 | 4/2018 | Zhou et al. | |
| 2018/0269945 | A1* | 9/2018 | Zhang | H04W 16/28 |
| 2019/0132778 | A1* | 5/2019 | Park | H04B 17/309 |
| 2019/0222284 | A1* | 7/2019 | Huang | H04W 72/23 |
| 2019/0238202 | A1 | 8/2019 | Chavva et al. | |
| 2019/0281607 | A1* | 9/2019 | Gao | H04B 7/0408 |
| 2019/0313393 | A1 | 10/2019 | Wang et al. | |
| 2019/0356398 | A1* | 11/2019 | Kim | H04W 24/08 |
| 2020/0229157 | A1* | 7/2020 | Rastegardoost | H04L 5/0098 |
| 2020/0313742 | A1* | 10/2020 | Lee | H04B 7/0626 |
| 2020/0337048 | A1* | 10/2020 | Abedini | H04L 1/0009 |
| 2020/0351730 | A1* | 11/2020 | Park | H04W 36/0058 |
| 2020/0358500 | A1* | 11/2020 | Ryu | H04B 7/063 |
| 2021/0036800 | A1* | 2/2021 | Berliner | H04L 1/0003 |
| 2021/0160028 | A1* | 5/2021 | Park | H04L 5/0048 |
| 2021/0184748 | A1* | 6/2021 | Luo | H04W 52/143 |
| 2021/0195605 | A1* | 6/2021 | Nilsson | H04W 72/044 |
| 2022/0255591 | A1* | 8/2022 | Park | H04W 36/362 |

FOREIGN PATENT DOCUMENTS

| | | |
|---|---|---|
| CN | 110087316 A | 8/2019 |
| WO | 2019074761 A1 | 4/2019 |
| WO | 2019160669 A1 | 8/2019 |
| WO | 2019199858 A1 | 10/2019 |

OTHER PUBLICATIONS

Nokia et al., "Decoupling DL and UL beam selection", 3GPP TSG RAN WG1 Meeting #93, R1-1807189, Busan, Korea, Apr. 21-25, 2018, 2 pages.

* cited by examiner

BEAM SELECTION METHOD AND COMMUNICATION APPARATUS

CROSS-REFERENCE TO RELATED APPLICATIONS

This application is a national stage of International Application No. PCT/CN2020/132444, filed on Nov. 27, 2020, which claims priority to Chinese Patent Application No. 202010061359.5, filed on Jan. 19, 2020. Both of the aforementioned applications are hereby incorporated by reference in their entireties.

TECHNICAL FIELD

This application relates to the field of communication technologies, and in particular, to a beam selection method and a communication apparatus.

BACKGROUND

Currently, standards organizations in different countries and regions have strict requirements on radio frequency energy exposure of a mobile terminal. For a millimeter-wave frequency band of 6 gigahertz (gigahertz, GHz) to 100 GHz, maximum permissible exposure (maximum permissible exposure, MPE) is generally used as a standard for evaluating the radio frequency energy exposure of the mobile terminal. For example, Table 1 shows radio frequency energy exposure standards for the mobile terminal specified by the Communate European (Conformite Europeenne, CE), the Federal Communications Commission (Federal Communications Commission, FCC), and the Nippon Telegraph & Telephone (Nippon Telegraph & Telephone, NTT). The radio frequency energy exposure standard for the mobile terminal specified by the FCC is used as an example. As shown in Table 1, within 4 seconds (s), an average power spectrum density calculated based on power received within an area of 4 square centimeters on a human body that is 5 mm away from the mobile terminal does not exceed 10 $W/m^2$.

TABLE 1

| Standards organizations | Distance (mm) | Area ($cm^2$) | Time (Second) | MPE ($W/m^2$) |
|---|---|---|---|---|
| CE | 5 | 4 | 360 | 20 |
| FCC | 5 | 4 | 4 | 10 |
| NTT | 15 | 4 | 360 | 20 |

Therefore, in millimeter-wave communication, before sending an uplink signal by using a transmit beam, the mobile terminal needs to perform power back-off to reduce uplink transmit power. In this case, the radio frequency energy exposure of the mobile terminal satisfies a regulation of the standards organization. Specifically, for a mobile terminal that supports a beam correspondence (beam correspondence) capability, a receive beam used by the mobile terminal to receive a downlink signal is determined according to a transmit beam used for sending an uplink signal, that is, the receive beam used by the mobile terminal to receive the downlink signal is the transmit beam used for sending the uplink signal. However, the transmit beam used by the mobile terminal to send the uplink signal is determined based on a measurement result of a downlink reference signal. In other words, in the conventional technology, the transmit beam used by the mobile terminal that supports the beam correspondence capability to send the uplink signal is determined based on the measurement result of the downlink reference signal. However, this transmit beam determining manner may reduce uplink communication performance after the mobile terminal performs power back-off.

SUMMARY

Embodiments of this application provide a beam selection method and a communication apparatus, to help improve uplink communication performance when radio frequency energy exposure is satisfied after a terminal performs power back-off.

According to a first aspect, an embodiment of this application provides a beam selection method, specifically including: A terminal receives a downlink reference signal from a third beam of a network device on a first beam and a second beam. The terminal performs reference signal receiving power (reference signal receiving power, RSRP) measurement on the first beam to obtain first RSRP, and performs RSRP measurement on the second beam to obtain second RSRP, where the first RSRP is receiving power at which the terminal receives the downlink reference signal from the third beam by using the first beam, and the second RSRP is receiving power at which the terminal receives the downlink reference signal from the third beam by using the second beam. The terminal performs MPE measurement on the first beam to obtain first back-off power, and performs MPE measurement on the second beam to obtain second back-off power, where the first back-off power is a decreased value of uplink transmit power when the terminal sends an uplink signal by using the first beam, and the second back-off power is a smaller value of the uplink transmit power when the terminal sends the uplink signal by using the second beam. When a difference between the first RSRP and the first back-off power is greater than a difference between the second RSRP and the first back-off power, the terminal sends uplink data by using the first beam.

In this embodiment of this application, the terminal may select an uplink working beam with reference to the measured back-off power of the first beam and the measured back-off power of the second beam. This helps improve uplink communication performance of the terminal.

In a possible design, when the difference between the first RSRP and the first back-off power is greater than the difference between the second RSRP and the first back-off power, a downlink working beam of the terminal is the first beam. This helps simplify a downlink working beam determining manner.

In a possible design, when the first RSRP is less than the second RSRP, the terminal selects the second beam from the first beam and the second beam, as a downlink working beam. The foregoing technical solution helps improve downlink communication performance.

In a possible design, the terminal may perform MPE measurement on the first beam in the following manner, to obtain the first back-off power.

The terminal measures a distance between the first beam and a human body, and determines the first back-off power based on the distance between the beam and the human body and the uplink transmit power. The first back-off power is back-off power that corresponds to the distance between the beam and the human body and the uplink transmit power. This is easy to implement.

In a possible design, the terminal reports power measurement results of the first beam and the second beam to the network device. The power measurement results of the first beam and the second beam include the first RSRP, the second RSRP, the first back-off power, and the second back-off power. Alternatively, the power measurement results of the first beam and the second beam include the difference between the first RSRP and the first back-off power, and the difference between the second RSRP and the second back-off power. In this way, the network device can learn of the power measurement results of the first beam and the second beam from the terminal.

In a possible design, the terminal receives a beam adjustment notification from the network device. The beam adjustment notification includes an uplink working beam. The terminal selects the first beam from the first beam and the second beam based on the beam adjustment notification, as the uplink working beam. The foregoing technical solution helps simplify processing steps of the terminal. Further, the network device may select a beam with reference to power measurement results of a plurality of beams from another terminal device, to improve uplink and downlink communication performance of each terminal.

According to a second aspect, an embodiment of this application provides a beam training method, specifically including:

A network device sends a downlink reference signal on a third beam, and receives power measurement results that are of a first beam and a second beam and that are reported by a terminal. The power measurement results of the first beam and the second beam include first RSRP, second RSRP, first back-off power, and second back-off power, or the power measurement results of the first beam and the second beam include a difference between first RSRP and first back-off power and a difference between second RSRP and second back-off power.

The first RSRP is receiving power at which the terminal receives the downlink reference signal from the third beam by using the first beam, the second RSRP is receiving power at which the terminal receives the downlink reference signal from the third beam by using the second beam, the first back-off power is a decreased value of uplink transmit power when the terminal sends an uplink signal by using the first beam, and the second back-off power is a smaller value of the uplink transmit power when the terminal sends the uplink signal by using the second beam.

When the difference between the first RSRP and the first back-off power is greater than the difference between the second RSRP and the first back-off power, the network device determines that an uplink working beam of the terminal is the first beam, and sends a beam adjustment notification to the terminal. The beam adjustment notification includes the uplink working beam.

In this embodiment of this application, the network device may select the uplink working beam with reference to the back-off power of the first beam and the back-off power of the second beam, where the back-off power is measured by the terminal. This helps improve uplink communication performance of the terminal and reduce processing steps of the terminal. Further, the network device may select an uplink beam with reference to power measurement results of different beams from a plurality of terminals, to improve uplink and downlink communication performance of the plurality of terminals.

In a possible design, when the difference between the first RSRP and the first back-off power is greater than the difference between the second RSRP and the first back-off power, a downlink working beam of the terminal is the first beam. This helps simplify a downlink working beam determining manner.

In a possible design, when the first RSRP is less than the second RSRP, the network device determines that the downlink working beam of the terminal is the second beam. The foregoing technical solution helps improve downlink communication performance.

According to a third aspect, this application provides a communication apparatus. The communication apparatus may be a terminal, an apparatus in a terminal, or an apparatus that can be used together with a terminal. The apparatus may include a processing module and a transceiver module. In addition, the processing module and the transceiver module may perform corresponding functions in the method according to any one of the first aspect or the possible designs of the first aspect. Details are as follows:

The transceiver module is configured to receive a downlink reference signal from a third beam of a network device on a first beam and a second beam.

The processing module is configured to: perform reference signal receiving power RSRP measurement on the first beam to obtain first RSRP, and perform RSRP measurement on the second beam to obtain second RSRP; and perform maximum permissible exposure MPE measurement on the first beam to obtain first back-off power, and perform MPE measurement on the second beam to obtain second back-off power.

The transceiver module is further configured to: when a difference between the first RSRP and the first back-off power is greater than a difference between the second RSRP and the first back-off power, send uplink data by using the first beam.

The first RSRP is receiving power at which the terminal receives the downlink reference signal from the third beam by using the first beam. The second RSRP is receiving power at which the terminal receives the downlink reference signal from the third beam by using the second beam. The first back-off power is a decreased value of uplink transmit power when the terminal sends an uplink signal by using the first beam. The second back-off power is a smaller value of the uplink transmit power when the terminal sends the uplink signal by using the second beam.

According to a fourth aspect, this application provides a communication apparatus. The communication apparatus may be a network device, an apparatus in a network device, or an apparatus that can be used together with a network device. The apparatus may include a processing module and a transceiver module. In addition, the processing module and the transceiver module may perform corresponding functions in the method according to any one of the second aspect or the possible designs of the second aspect. Details are as follows:

The transceiver module is configured to: send a downlink reference signal on a third beam, and receive power measurement results that are of a first beam and a second beam and that are reported by a terminal. The power measurement results of the first beam and the second beam include first RSRP, second RSRP, first back-off power, and second back-off power. Alternatively, the power measurement results of the first beam and the second beam include a difference between first RSRP and first back-off power and a difference between second RSRP and second back-off power.

The first RSRP is receiving power at which the terminal receives the downlink reference signal from the third beam by using the first beam. The second RSRP is receiving power at which the terminal receives the downlink reference signal from the third beam by using the second beam. The first back-off power is a decreased value of uplink transmit power when the terminal sends an uplink signal by using the first beam. The second back-off power is a smaller value of the uplink transmit power when the terminal sends the uplink signal by using the second beam.

The processing module is configured to: when the difference between the first RSRP and the first back-off power is greater than the difference between the second RSRP and the first back-off power, determine that an uplink working beam of the terminal is the first beam.

The transceiver module is further configured to send a beam adjustment notification to the terminal. The beam adjustment notification includes the uplink working beam.

According to a fifth aspect, an embodiment of this application provides a communication apparatus. The communication apparatus includes a processor, configured to implement the method described in the first aspect. The communication apparatus may further include a memory, configured to store instructions and data. The memory is coupled to the processor. When the processor executes the program instructions stored in the memory, the method described in the first aspect and/or the second aspect can be implemented. The communication apparatus may further include a communication interface. The communication interface is used by the apparatus to communicate with another device. For example, the communication interface may be a transceiver, a circuit, a bus, a module, or another type of communication interface, and the another device may be a network device or a terminal device.

In a possible design, the communication apparatus includes: a memory, configured to store program instructions; and a processor, configured to invoke the instructions stored in the memory, to enable the apparatus to perform the method according to any one of the first aspect or the possible designs of the first aspect of embodiments of this application, or enable the apparatus to perform the method according to any one of the second aspect or the possible designs of the second aspect of embodiments of this application.

According to a sixth aspect, embodiments of this application further provide a computer-readable storage medium including instructions. When the instructions are run on a computer, the computer is enabled to perform the method according to any one of the first aspect and the possible designs of the first aspect, or the method according to any one of the second aspect and the possible designs of the second aspect.

According to a seventh aspect, embodiments of this application further provide a chip system. The chip system includes a processor, and may further include a memory, configured to implement the method according to any one of the first aspect and the possible designs of the first aspect, or the method according to any one of the second aspect and the possible designs of the second aspect. The chip system may include a chip, or may include a chip and another discrete component.

According to an eighth aspect, embodiments of this application further provide a computer program product including instructions. When the instructions are run on a computer, the computer is enabled to perform the method according to any one of the first aspect and the possible designs of the first aspect, or the method according to any one of the second aspect and the possible designs of the second aspect.

In addition, for technical effects brought by any possible design manner in the third aspect to the eighth aspect, refer to technical effects brought by different design manners in the method part. Details are not described herein again.

DETAILED DESCRIPTION OF ILLUSTRATIVE EMBODIMENTS

Figure 1:
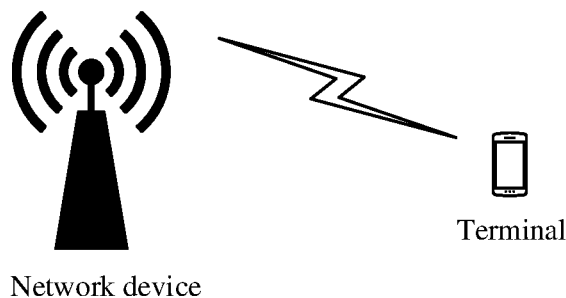
FIG. 1 is a schematic diagram of a network architecture of a communication system according to an embodiment of this application.

It should be understood that, unless otherwise stated in this application, "/" means or. For example, A/B may represent A or B. The term "and/or" is merely an association relationship for describing associated objects, and indicates that three relationships may exist. For example, A and/or B may represent the following cases: Only A exists, both A and B exist, and only B exists. In addition, in this application, "a plurality of" means two or more. For example, at least one of a, b, or c may represent seven cases: a, b, c, a and b, a and c, b and c, and a, b and c.

In this application, "example", "in some embodiments", "in some other embodiments", or the like is used to represent giving an example, an illustration, or a description. Any embodiment or design scheme described as the "example" in this application should not be explained as being more preferred or having more advantages than another embodiment or design scheme. Exactly, the term "example" is used to present a concept in a specific manner.

It should be noted that, in this application, the terms "first", "second", and the like are only used for a purpose of distinguishing for description, but should not be understood as an indication or implication of relative importance or an indication or implication of a sequence.

Generally, in wireless communication, a terminal determines a downlink working beam based on downlink reference signal receiving power. The downlink working beam is a receive beam with maximum downlink reference signal receiving power in a plurality of receive beams of the terminal. Subsequently, the terminal receives a downlink signal from a network device by using the downlink working beam. When the terminal supports a beam correspondence (beam correspondence) capability, the terminal determines an uplink working beam based on the downlink working beam. To be specific, the terminal uses the downlink working beam as the uplink working beam, and subsequently the terminal sends an uplink signal to the network device by using the downlink working beam. This helps simplify an uplink working beam determining manner.

However, standards organizations in different countries and regions have strict requirements on radio frequency energy exposure of the terminal. In wireless communication, for a frequency band below 6 gigahertz (gigahertz, GHz), a specific absorption ratio (specific absorption ratio, SAR) is generally used as a standard for evaluating radio frequency energy of the terminal. For a frequency band of 6 GHz to 100 GHz, maximum permissible exposure (maximum permissible exposure, MPE) is generally used as a standard for evaluating radio frequency energy exposure of a mobile terminal. Therefore, in millimeter-wave communication, before sending the uplink signal to the network device by using the uplink working beam, the terminal may need to perform power back-off to reduce uplink transmit power. In this case, the radio frequency energy exposure of the terminal satisfies a radio frequency energy exposure requirement. However, if the terminal performs power back-off, the foregoing uplink working beam determining manner may reduce uplink communication performance.

In view of this, this application provides a beam selection method, to enable a terminal supporting a beam correspondence capability to select an uplink working beam with reference to measured back-off power of a plurality of beams. This helps improve uplink communication performance of the terminal.

In the following, some terms of embodiments of this application are described, to help a person skilled in the art have a better understanding.

1. Terminal (terminal) In embodiments of this application, a terminal supports a beam correspondence capability and is a device that has a wireless transceiver function, and may be referred to as a terminal device, user equipment (user equipment, UE), a mobile station (mobile station, MS), a mobile terminal (mobile terminal, MT), or the like. A specific form of the terminal may be a mobile phone (mobile phone), a cellular phone, a cordless phone, a session initiation protocol (session initiation protocol, SIP) phone, a wearable device, a tablet computer (pad), a desktop computer, a notebook computer, an all-in-one machine, an in-vehicle terminal, a wireless local loop (wireless local loop, WLL) station, a personal digital assistant (personal digital assistant, PDA), an internet of things terminal (such as an IoT device), or the like The terminal may be used in the following scenario: virtual reality (virtual reality, VR), augmented reality (augmented reality, AR), industrial control (industrial control), self driving (self driving), a smart grid (smart grid), a smart city (smart city), a smart home (smart home), an industrial sensor network, sports and fitness, or the like. The terminal may be fixed or movable. It should be noted that the terminal may support at least one wireless communication technology, such as NR or LTE.

2. Network device In embodiments of this application, a network device is a device that provides a wireless communication function for the terminal, and may alternatively be referred to as a radio access network (radio access network, RAN) device or the like. The network device includes but is not limited to: a next-generation NodeB (next generation NodeB, gNB) in 5G, an evolved NodeB (evolved NodeB, eNB), a baseband unit (baseband unit, BBU), a transmitting and receiving point (transmitting and receiving point, TRP), a transmitting point (transmitting point, TP), a relay station, an access point, and the like. The network device may alternatively be a radio controller, a centralized unit (centralized unit, CU), a distributed unit (distributed unit, DU), or the like in a cloud radio access network (cloud radio access network, CRAN) scenario. The network device may support at least one wireless communication technology, such as NR or LTE.

3. Beam. In embodiments of this application, a signal is received or sent between the terminal and the network device through a beam. Specifically, beams may be classified into a receive beam and a transmit beam based on a direction for receiving or sending the signal. The receive beam is used to receive the signal, and the transmit beam is used to send the signal. For example, the network device sends a downlink signal by using the transmit beam, and the terminal receives the downlink signal by using the receive beam. For another example, the terminal sends an uplink signal by using the transmit beam, and the network device receives the uplink signal by using the receive beam. The transmit beam used by the terminal and the receive beam used by the network device form a beam pair, and the receive beam used by the terminal and the transmit beam used by the network device also form a beam pair.

It should be noted that for the terminal, the receive beam may also be referred to as a downlink beam, and the transmit beam may also be referred to as an uplink beam. The receive beam used by the terminal to receive the downlink signal may also be referred to as a downlink working beam, and the transmit beam used by the terminal to send the uplink signal may also be referred to as an uplink working beam. When the terminal supports the beam correspondence capability, the terminal may determine the uplink working beam based on the downlink working beam, or determine the downlink working beam based on the uplink working beam.

4. Downlink reference signal In embodiments of this application, a downlink reference signal is a reference signal (reference signal, RS) sent by the network device to the terminal. The downlink reference signal may include a channel state reference signal (channel state information reference signal, CSI-RS), a synchronization signal block (synchronization signal block, SSB), a sounding reference signal (sounding reference signal, SRS), a demodulation reference signal (demodulation reference signal, DMRS), or the like. In different communication processes, downlink reference signals received by the terminal may be different. For example, in a random access process, the downlink reference signal received by the terminal is an SSB. For another example, after the terminal accesses the network device, in a beam tracking process, the received downlink reference signal is a CSI-RS. Specifically, the terminal may periodically, and/or receive the downlink reference signal in an event-triggered manner.

5. Back-off power In embodiments of this application, back-off power is a decreased value of uplink transmit power measured for a beam when the terminal uses the beam as the transmit beam. In this case, radio frequency energy of the terminal satisfies a radio frequency energy exposure requirement (for example, an MPE requirement specified by a standards organization). A beam i of the terminal is used as an example. Uplink transmit power of the beam i is P1, and back-off power that is of the beam i and that is obtained by the terminal through measurement is $\Delta P1$. In this case, uplink transmit power actually used by the terminal when the terminal sends an uplink signal by using the beam i is $P1-\Delta P1$. It should be noted that, when the terminal sends the uplink signal on the beam i based on $P1-\Delta P1$, radio frequency energy of the terminal meets the radio frequency energy exposure requirement. The uplink transmit power P1 of the beam i may be understood as uplink transmit power of the terminal, and may be indicated by the network device to the terminal.

Embodiments of this application may be applied to a millimeter-wave communication system, for example, an NR communication system, or another communication system, for example, a future mobile communication system (for example, a 6G communication system). For example, FIG. 1 is a schematic diagram of a network architecture of a communication system according to an embodiment of this application. The communication system includes a network device and a terminal.

It should be understood that, the network architecture of the communication system shown in FIG. 1 is merely an example, and does not constitute a limitation on the network architecture of the communication system in this embodiment of this application. A quantity of network devices and a quantity of terminals in the communication system are not limited in embodiments of this application. For example, when the communication system in this embodiment of this application includes a plurality of network devices, coordinated multipoint communication may be performed between a network device and a network device. For example, the communication system includes a plurality of macro base stations and a plurality of micro base stations. Coordinated multipoint communication may be performed between a macro base station and a macro base station, between a micro base station and a micro base station, or between a macro base station and a micro base station.

It should be noted that, in this embodiment of this application, communication between the network device and the terminal may be performed by using a licensed spectrum (licensed spectrum), or may be performed by using an unlicensed spectrum (unlicensed spectrum), or may be performed by using both a licensed spectrum and an unlicensed spectrum. This is not limited herein.

Beam selection in embodiments of this application is described in detail by using the network architecture of the communication system shown in FIG. 1 as an example.

Figure 2:
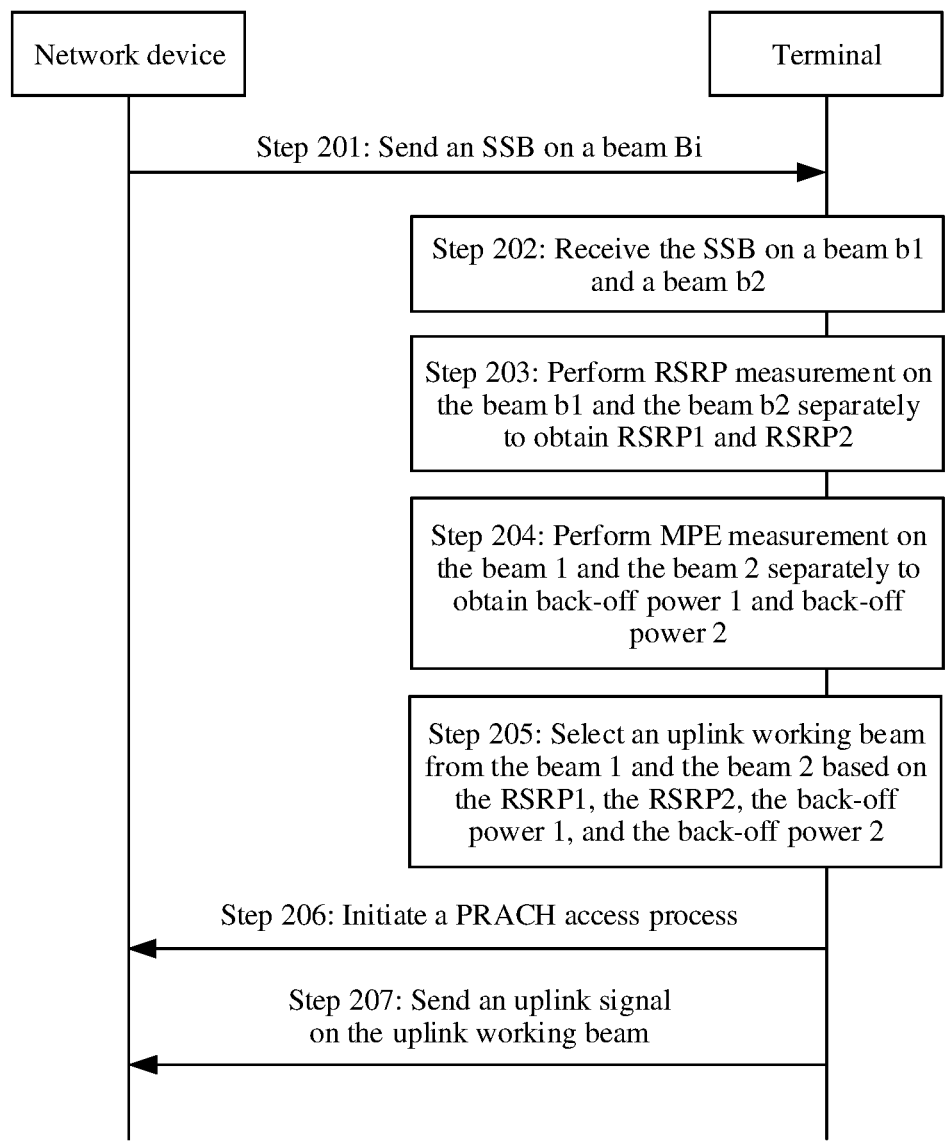
FIG. 2 is a schematic flowchart of a beam selection method according to an embodiment of this application.

Example 1: As shown in FIG. 2, a beam selection method in an initial access process according to an embodiment of this application specifically includes the following steps.

Step 201: A network device periodically sends an SSB on a beam Bi. The first beam is a beam of the network device.

For example, the network device periodically broadcasts or multicasts the SSB on the beam Bi. When the network device has a plurality of beams, the beam Bi is one of the plurality of beams of the network device, and beams used to send the SSB in different periodicities may be the same or may be different. In addition, there may be one or more beams used by the network device to send the SSB. Specifically, a beam used by the network device to send the SSB may be predefined in a protocol, or may be preconfigured based on an algorithm or a policy. This is not limited herein.

For example, the network device sends the SSB on a beam B1 and a beam B2 separately in a $Ti^{th}$ periodicity. The network device sends the SSB on the beam B1, the beam B2, and a beam B3 separately in a $Tj^{th}$ periodicity. In the $Ti^{th}$ periodicity, the beam Bi may be the beam B1, or may be the beam B2. In the $Tj^{th}$ periodicity, the beam Bi is one of the beam B1, the beam B2, and the beam B3.

In addition, a periodicity of sending the SSB by the network device may be 5 ms, 10 MS, 20 ms, 30 ms, or the like, and may be predefined in a protocol, or may be determined based on an algorithm or a policy. This is not limited herein. For example, the network device may determine, with reference to a packet loss rate, a delay, or the like of an uplink signal, the periodicity for sending the SSB.

Step 202: The terminal receives the SSB from the beam Bi of the network device on a beam b1 and a beam b2 separately. The beam b1 and the beam b2 are beams of the terminal.

Specifically, the terminal may perform step 202 in an event-triggered manner. To be specific, the terminal may receive the SSB from the network device on the beam 1 and the beam 2 separately in the event-triggered manner. For example, the terminal triggers execution of step 202 in response to a power-on operation of a user. For another example, the terminal triggers execution of step 202 in response to an operation performed by the user on an application program. For example, in response to opening a video in a video application by the user, the terminal triggers execution of step 202. For another example, the terminal triggers execution of step 202 in response to an operation of making a call by the user or being woken up. For another example, in response to receiving an incoming call request, the terminal triggers execution of step 202. The foregoing is merely an example of an event that triggers the terminal to receive the SSB and perform an initial access procedure, and constitutes no limitation on this embodiment of this application. In this application, the terminal may be triggered, by another event, to receive the SSB.

Figure 3:
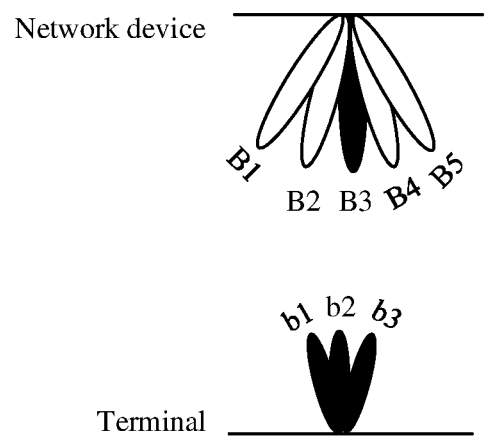
FIG. 3 is a schematic diagram of an application scenario according to an embodiment of this application.

The foregoing is described by using an example in which the terminal receives the SSB from the network device by using the beam 1 and the beam 2. In this embodiment of this application, when the terminal includes three or more beams, the terminal may further receive the SSB from the network device by using the three or more beams. Specifically, a beam used by the terminal to receive the SSB from the beam Bi of the network device may be predefined in a protocol, or may be preconfigured based on an algorithm or a policy. This is not limited herein. For example, as shown in FIG. 3, the network device sends an SSB on beams B1, B2, B3, B4, and B5 separately in a $Ti^{th}$ periodicity. For example, the beam Bi is the beam B3. The terminal may receive the SSB from the beam B3 by using beams b1, b2, and b3 separately, and then perform RSRP measurement on the beams b1, b2, and b3 separately.

Step 203: The terminal performs reference signal receiving power (reference signal receiving power, RSRP) measurement on the beam b1 to obtain RSRP1, and performs RSRP measurement on the beam b2 to obtain RSRP2. The RSRP1 is receiving power of the SSB that is from the beam Bi and that is received on the beam b1. The RSRP2 is receiving power of the SSB that is from the beam Bi and that is received on the beam b2.

For example, the terminal performs RSRP measurement on the beam b1 to obtain L1-RSRP1, and performs RSRP measurement on the beam b2 to obtain L1-RSRP2.

Step 204. The terminal performs MPE measurement on the beam b1 to obtain back-off power 1, and performs MPE measurement on the beam b2 to obtain back-off power 2.

The beam b1 is used as an example to describe the MPE measurement. For an implementation in which the terminal performs the MPE measurement on the beam b2, refer to the implementation in which the terminal performs the MPE measurement on the beam b1.

Figure 4:
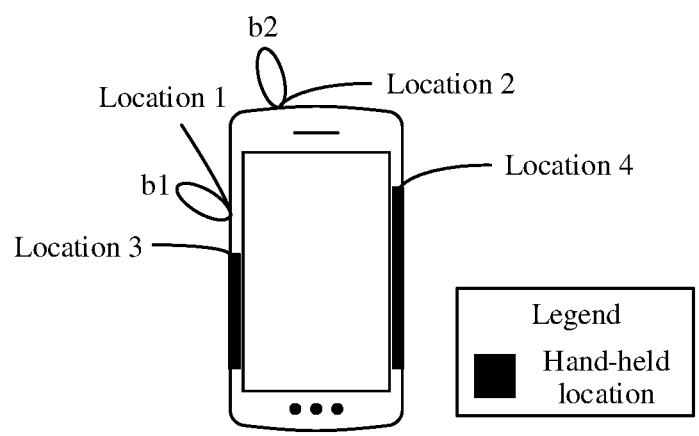
FIG. 4 is a schematic diagram of a beam location according to an embodiment of this application.

For example, the terminal measures a distance between the beam b1 and a human body, and determines the back-off power 1 based on the distance between the beam b1 and the human body. For example, the distance between the beam b1 and the human body may be understood as a shortest distance between the human body and a location at which the terminal sends a signal by using the beam b1. For example, as shown in FIG. 4, when the user holds the terminal, the distance between the beam b1 and the human body is a distance between a location 1 and a location 3, and a distance between the beam b2 and the human body is a distance between a location 2 and a location 4. The location 1 is the location at which the terminal sends the signal by using the beam b1, the location 2 is a location at which the terminal sends the signal by using the beam b2, and the location 3 and the location 4 are locations at which the user holds the terminal. When the user holds the terminal, at the location 3, the beam b1 is closest to the human body, and at the location 4, the beam b2 is closest to the human body. The terminal may measure the distance between the beam b1 and the human body through a proximity sensor.

For example, a correspondence among different uplink transmit power, different distances between a beam and the human body, and back-off power may be preconfigured in the terminal. The back-off power 1 is back-off power that corresponds to the distance between the beam 1 and the human body. For example, the correspondence among the uplink transmit power, the distance between the beam and the human body, and the back-off power may be shown in Table 2.

TABLE 2

| | Uplink transmit power (W) | | |
|---|---|---|---|
| Between a beam and the human body Distance (mm) | P1 | ... | Pm |
| | | Back-off power | |
| [0, 1) | $\Delta$P11 | ... | $\Delta$P1m |
| [1, 2) | $\Delta$P21 | ... | $\Delta$P2m |
| ... | ... | ... | ... |
| [n − 1, n) | $\Delta$Pn1 | ... | $\Delta$Pnm |

For example, when the distance that is between the beam 1 and the human body and that is measured by the terminal through the proximity sensor falls within a range of [1, 2), as shown in Table 2, when the uplink transmit power indicated by the network device to the terminal device is P1, back-off power corresponding to [1, 2) is $\Delta$P21. Therefore, the back-off power 1 is $\Delta$P21.

Step 205: The terminal selects an uplink working beam from the beam b1 and the beam b2 based on the RSRP1, the RSRP2, the back-off power 1, and the back-off power 2. The uplink working beam is a beam that is of the beam b1 or the beam b2, and that has a difference between the RSRP and the back-off power satisfying a first condition. A greater difference between the RSRP and the back-off power indicates that when the terminal sends a signal to the network device by using the beam, receiving power at which the network device receives the signal from the terminal is higher, and uplink communication performance on the beam is better.

For example, the uplink working beam is a beam that is of the beam b1 or the beam b2, and that has a greater difference between the RSRP and the back-off power. For example, the back-off power 1 is $\Delta$P1, and the back-off power 2 is $\Delta$P2. When RSRP1−$\Delta$P1<RSRP2−$\Delta$P2, the terminal may use the beam b2 as the uplink working beam.

For another example, the uplink working beam is a beam that is of the beam b1 or the beam b2, and that has a difference between the RSRP and the back-off power, where the difference is greater than or equal to a first threshold. For example, the first threshold may be predefined, may be determined by the terminal based on an algorithm, or may be indicated by the network device to the terminal. This is not limited herein. When both the beam b1 and the beam b2 are beams that have differences between the RSRP and the back-off power, and the differences are greater than the first threshold, any one of the beam 1 and the beam 2 can be used as the uplink working beam of the terminal. Alternatively, a beam with greater RSRP in a plurality of beams may be used as the uplink working beam of the terminal, where the plurality of beams have differences between the RSRP and the back-off power, and the differences are greater than or equal to the first threshold. For example, if the back-off power 1 is $\Delta$P1, the back-off power 2 is $\Delta$P2, RSRP1−$\Delta$P1=RSRP2−$\Delta$P2, and RSRP2>RSRP1, the beam b2 is used as the uplink working beam.

It should be noted that, in an embodiment of this application, the uplink working beam is determined based on the difference between the RSRP and the back-off power. In some possible embodiments, the uplink working beam may be further determined based on a ratio of the RSRP to the back-off power or through another algorithm. This is not limited in this application.

Step 206: The terminal initiates a physical random access channel (physical random access channel, PRACH) access process to the network device based on the selected uplink working beam.

Step 207: After the PRACH access process is completed, the terminal sends a signal to the network device on the uplink working beam. Power used for sending the signal to the network device on the uplink working beam is a difference between uplink transmit power and back-off power of the uplink working beam. For example, the uplink working beam is the beam b2, and power used for sending a signal to the network device on the beam b2 is a difference between the uplink transmit power and the back-off power 2.

It should be noted that there is no necessary sequence between step 203 and step 204. The terminal may first perform step 203, and then perform step 204. Alternatively, the terminal may first perform step 204, and then perform step 203. Alternatively, the terminal simultaneously performs step 203 and step 204.

In this embodiment of this application, because the terminal selects the uplink working beam based on RSRP and back-off power of different beams, impact of power back-off on uplink communication is considered. This helps improve uplink communication performance.

It should be noted that, in this embodiment of this application, the terminal performs step 202 to step 206 through a modem processor. To be specific, the modem processor receives the SSB from the beam Bi of the network device by using the beam b1 and the beam b2, performs RSRP measurement and MPE measurement on the beam b1 and the beam b2 separately, and then selects the uplink working beam from the beam b1 and the beam b2 based on measurement results.

In some embodiments, when the terminal supports the beam correspondence capability, the terminal may determine a downlink working beam based on the uplink working beam. Specifically, the terminal may use the uplink working beam as the downlink working beam. In other words, the terminal subsequently receives a signal from the network device on the selected uplink working beam.

For example, the terminal selects the beam b2 from the beam b1 and the beam b2 as the uplink working beam and the downlink working beam based on the RSRP1, the RSRP2, the back-off power 1, and the back-off power 2.

Alternatively, in some other embodiments, the terminal selects the downlink working beam from the beam b1 and the beam b2 based on the RSRP1 and the RSRP2. The downlink working beam is a beam with a greater RSRP in the beam b1 and the beam b2. This helps improve downlink communication performance.

For example, RSRP2>RSRP1, the terminal may use the beam b2 as the downlink working beam.

Example 2: When the terminal is in a connected mode, to be specific, after the terminal accesses a network, the terminal may perform beam tracking. In a beam tracking process, different from the beam selection method in the initial access process, a downlink reference signal sent by the network device is a CSI-RS.

Specifically, the terminal may perform beam tracking periodically and/or in an event-triggered manner. It should be noted that a periodicity in which the terminal performs beam tracking may be predefined in a protocol, or may be determined by the terminal based on an algorithm or a policy. This is not limited herein. For example, the terminal may trigger beam tracking when a transmission delay is greater than or equal to a second threshold and a packet loss rate is greater than or equal to a third threshold.

Figure 5:
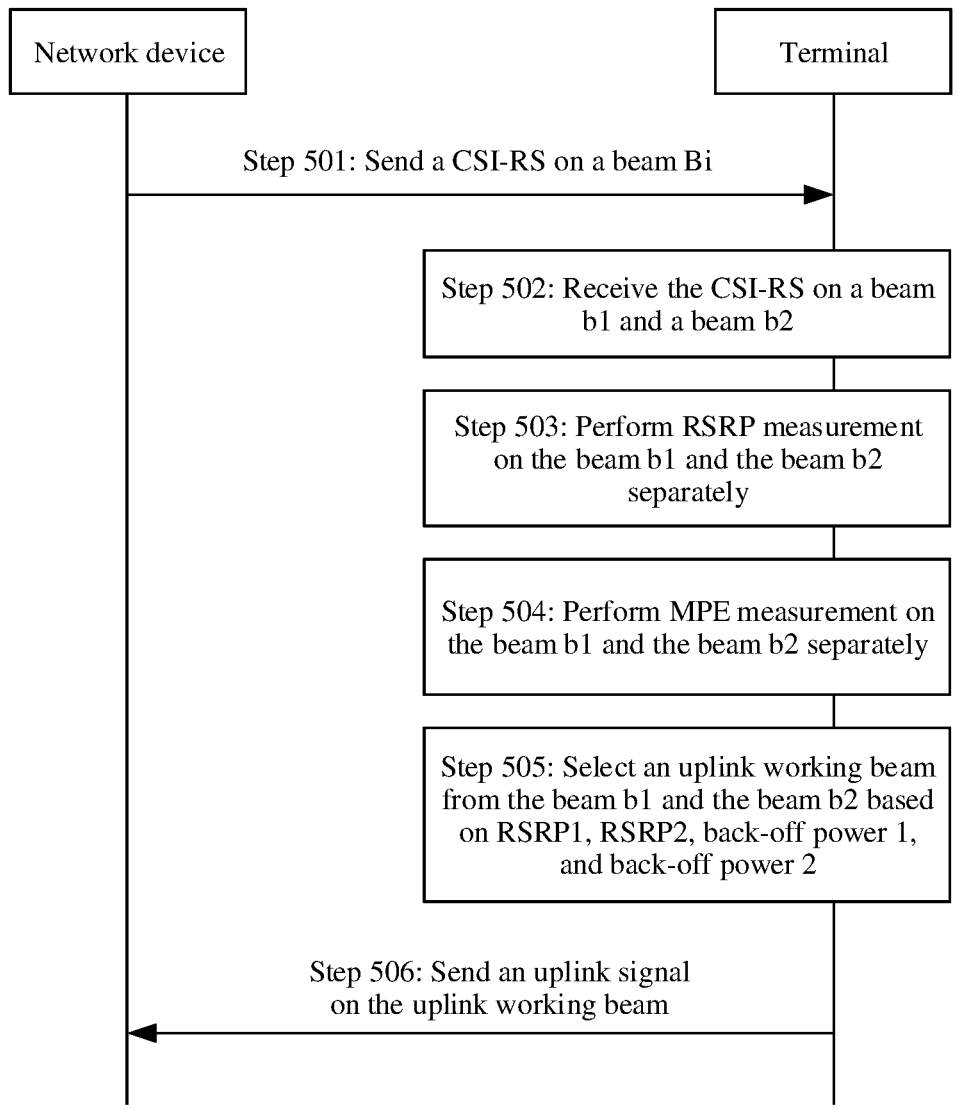
FIG. 5 is a schematic flowchart of another beam selection method according to an embodiment of this application.

For example, beam selection is performed in a periodicity. FIG. 5 shows a beam selection method in a beam tracking process according to an embodiment of this application. The method specifically includes the following steps.

Step 501: A network device sends a CSI-RS to a terminal on a beam Bi. The beam Bi is a beam of the network device.

For example, the network device may send the CSI-RS to the terminal on the beam Bi in a unicast manner.

Step 502: The terminal separately receives the CSI-RS from the beam Bi of the network device on a beam b1 and a beam b2.

Step 503: The terminal performs RSRP measurement on the beam b1 to obtain RSRP1, and performs RSRP measurement on the beam b2 to obtain RSRP2. The beam b1 and the beam b2 are beams of the terminal. The RSRP1 is receiving power of the CSI-RS that is from the beam Bi of the network device and that is received on the beam b1, and the RSRP2 is receiving power of the CSI-RS that is from the beam Bi of the network device and that is received on the beam b2.

Step 504: The terminal performs MPE measurement on the beam b1 to obtain back-off power 1, and performs MPE measurement on the beam b2 to obtain back-off power 2.

Step 505: The terminal selects an uplink working beam from the beam b1 and the beam b2 based on the RSRP1, the RSRP2, the back-off power 1, and the back-off power 2. The uplink working beam is a beam that is of the beam b1 or the beam b2, and that has a difference between the RSRP and the back-off power satisfying a first condition.

Step 506: The terminal sends a signal to the network device on the uplink working beam. Power used for sending the signal to the network device on the uplink working beam is a difference between uplink transmit power and back-off power of the uplink working beam.

Specifically, for specific implementations of RSRP measurement, MPE measurement, and the like in Example 2, refer to related implementations in Example 1. Details are not described herein again.

In addition, for a downlink working beam determining manner, refer to the related implementation in Example 1. Details are not described herein again.

It should be noted that, in a beam tracking process, when the network device periodically sends a CSI-RS on one or more beams, correspondingly, the terminal may periodically receive the CSI-RS on the one or more beams. In each periodicity, beams used by the network device to send the CSI-RS may be the same or may be different, and beams used by the terminal to receive the CSI-RS may be the same or may be different. This is not limited. For example, in a $Ti^{th}$ periodicity, the network device sends the CSI-RS to the terminal on the beam B1 and the beam B2 separately. The terminal receives the CSI-RS from the beam B1 on the beams b1, b2, and b3. In this case, the terminal performs RSRP measurement and MPE measurement on the beams b1, b2, and b3 separately. In a $Tj^{th}$ periodicity, the network device sends the CSI-RS to the terminal on the beams B1, B2, and B3 separately. The terminal separately receives the CSI-RS from the beam B3 on the beams b1 and b4. In this case, the terminal performs RSRP measurement and MPE measurement on the beams b1 and b4 separately.

Figure 6:
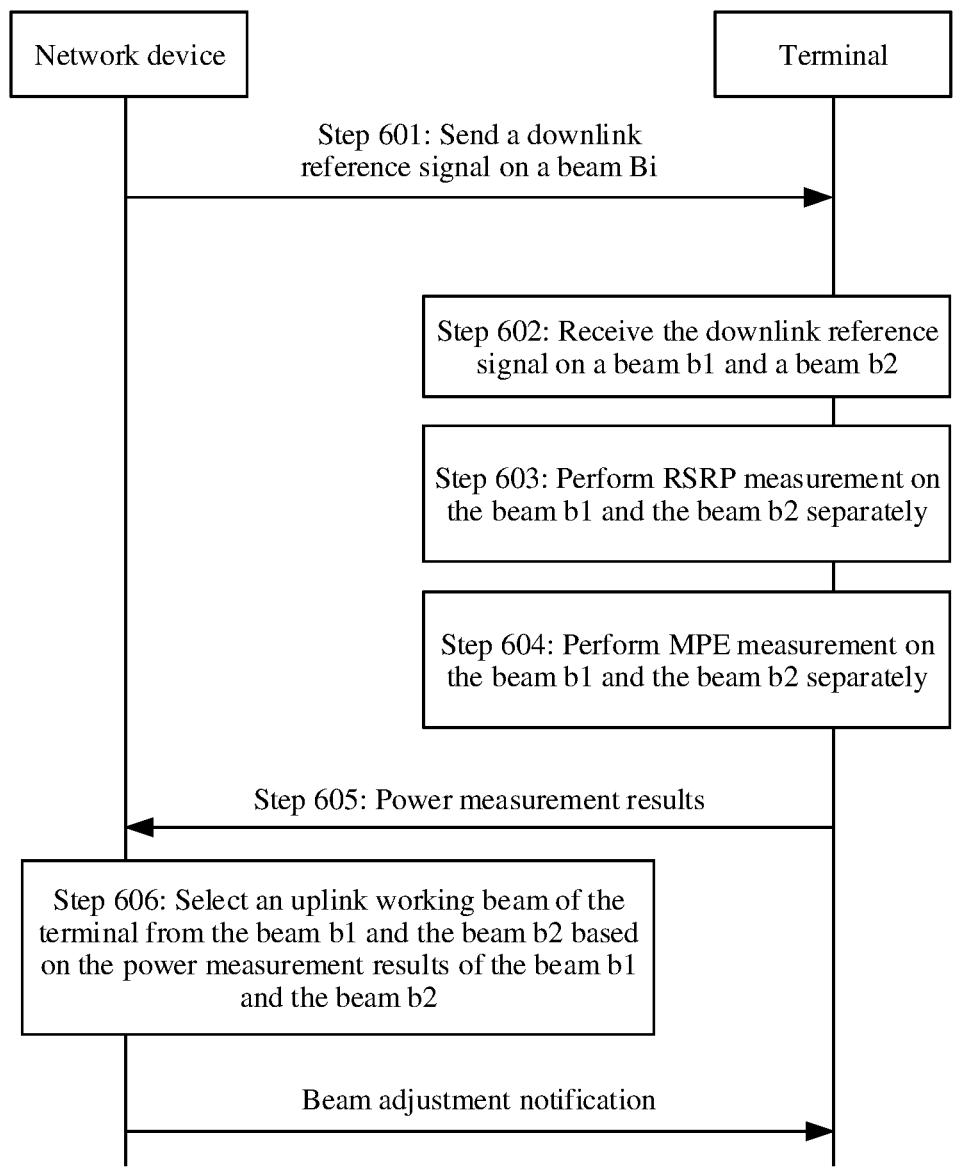
FIG. 6 is a schematic flowchart of still another beam selection method according to an embodiment of this application.

Example 3: As shown in FIG. 6, an embodiment of this application further provides a beam selection method, and the method specifically includes the following steps.

Step 601: A network device sends a downlink reference signal on a beam Bi. The beam Bi is a beam of the network device.

Step 602: A terminal receives the downlink reference signal from the beam Bi of the network device on a beam b1 and a beam b2.

Step 603: The terminal performs RSRP measurement on the beam b1 to obtain RSRP1, and performs RSRP measurement on the beam b2 to obtain RSRP2. The beam b1 and the beam b2 are beams of the terminal. The RSRP1 is receiving power of the downlink reference signal that is from the beam Bi of the network device and that is received on the beam b1, and the RSRP2 is receiving power of the downlink reference signal that is from the beam Bi of the network device and that is received on the beam b2.

Step 604: The terminal performs MPE measurement on the beam b1 to obtain back-off power 1, and performs MPE measurement on the beam b2 to obtain back-off power 2.

Step 605: The terminal reports power measurement results of the beam b1 and the beam b2 to the network device. For example, the power measurement results of the beam b1 and the beam b2 include a difference between the RSRP1 and the back-off power 1, and a difference between the RSRP2 and the back-off power 2. For another example, the power measurement results of the beam b1 and the beam b2 include the RSRP1, the RSRP2, the back-off power 1, and the back-off power 2.

Step 606: After receiving the power measurement results that are of the beam b1 and the beam b2 and that are reported by the terminal, the network device selects an uplink working beam of the terminal from the beam b1 and the beam b2 based on the power measurement results of the beam b1 and the beam b2.

In some embodiments, the network device may alternatively select a downlink working beam of the terminal from the beam b1 and the beam b2 based on the power measurement results of the beam b1 and the beam b2.

For example, for a manner in which the network device selects the uplink working beam and the downlink working beam of the terminal based on the power measurement results of the beam b1 and the beam b2, refer to related implementations in Example 1. Details are not described herein again. This helps reduce a workload of the terminal.

For another example, the network device may determine the uplink working beam and the downlink working beam of the terminal based on the power measurement results of the beam b1 and the beam b2 and with reference to power measurement results that are of a plurality of beams and that are reported by another terminal. The network device may determine the uplink working beam and the downlink working beam of each of a plurality of terminals with reference to the power measurement results that are of the plurality of beams and that are reported by the plurality of terminals. This helps improve communication performance of the plurality of terminals.

Further, after selecting the uplink working beam and the downlink working beam of the terminal, the network device may further send a beam adjustment notification to the terminal. The beam adjustment notification includes the uplink working beam and/or the downlink working beam that are/is of the terminal and that are/is selected by the network device. After receiving the beam adjustment notification, the terminal adjusts the uplink working beam to an uplink working beam indicated by the network device, or adjusts the downlink working beam to a downlink working beam indicated by the network device.

In addition, it should be further noted that the beam 1 is used as an example, and the foregoing description is provided by using an example in which the terminal performs RSRP measurement on the beam 1. In addition, the terminal may further measure a signal receiving status of the beam 1, to obtain a signal receiving measurement result 1. The signal receiving measurement result 1 is used to indicate a receiving status of the downlink reference signal that is from the beam Bi of the network device and that is received on the beam b1. For example, the terminal measures received signal strength of the beam 1 to obtain a received signal strength indication (received signal strength indication, RSSI) 1. For another example, the terminal measures signal receiving quality of the beam 1 to obtain reference signal receiving quality (reference signal receiving quality, RSRQ) 1.

When the signal receiving measurement result 1 is not the RSRP1, the terminal may determine the RSRP1 based on the signal receiving measurement result and an algorithm. For the beam 2, in addition to performing RSRP measurement on the beam 2, the terminal may measure a signal receiving status of the beam 2, to obtain a signal measurement result 2. For details, refer to related descriptions of the beam 1. Details are not described herein again.

The foregoing embodiments may be used separately, or may be used in combination to implement different technical effects.

Figure 7:
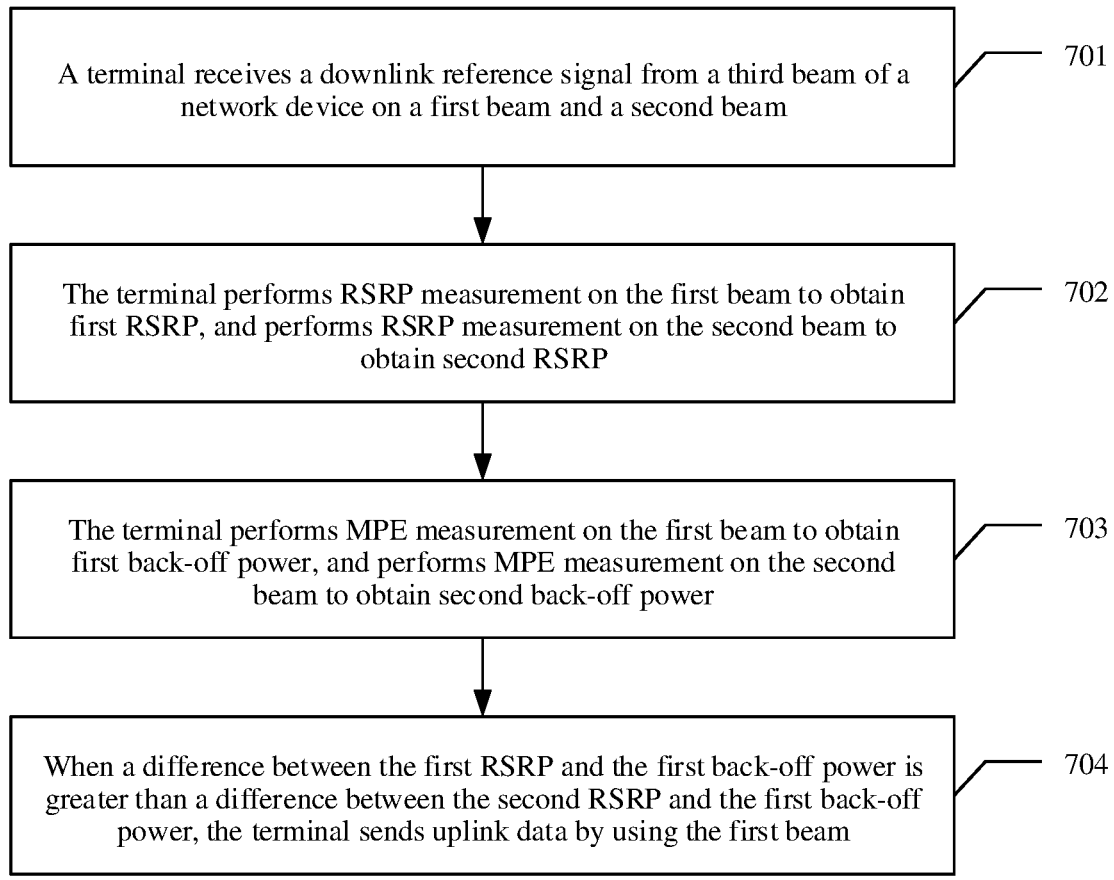
FIG. 7 is a schematic flowchart of yet another beam selection method according to an embodiment of this application.

With reference to the foregoing embodiments and accompanying drawings, an embodiment of this application provides a beam selection method. As shown in FIG. 7, the method specifically includes the following steps.

Step 701: A terminal receives a downlink reference signal from a third beam of a network device on a first beam and a second beam.

Step 702: The terminal performs RSRP measurement on the first beam to obtain first RSRP, and performs RSRP measurement on the second beam to obtain second RSRP, where the first RSRP is receiving power at which the terminal receives the downlink reference signal from the third beam by using the first beam, and the second RSRP is receiving power at which the terminal receives the downlink reference signal from the third beam by using the second beam.

Step 703: The terminal performs MPE measurement on the first beam to obtain first back-off power, and performs MPE measurement on the second beam to obtain second back-off power. The first back-off power is a decreased value of uplink transmit power when the terminal sends an uplink signal by using the first beam, and the second back-off power is a smaller value of the uplink transmit power when the terminal sends the uplink signal by using the second beam.

Step 704: When a difference between the first RSRP and the first back-off power is greater than a difference between the second RSRP and the first back-off power, the terminal sends uplink data by using the first beam. That is, the first beam is used as an uplink working beam.

It should be noted that for the third beam, refer to related descriptions of the beam Bi in the foregoing Examples 1 to 3. For the first beam and the second beam, refer to related descriptions of the beam b1 and the beam b2 in the foregoing Examples 1 to 3. Details are not described herein again. In addition, for a specific implementation of the MPE measurement in the beam selection method shown in FIG. 7, and the like, refer to the related descriptions in the foregoing examples 1 to 3. Details are not described herein again.

In the embodiments provided in this application, the beam selection method provided in embodiments of this application is described from a perspective of the terminal and the network device used as an execution body. To implement functions in the foregoing beam selection method provided in embodiments of this application, the terminal or the network device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 8:
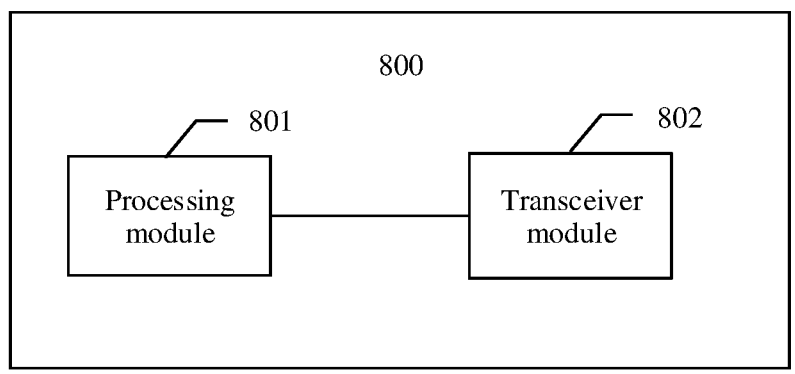
FIG. 8 is a schematic diagram of a structure of a communication apparatus according to an embodiment of this application.

Same as the foregoing concept, as shown in FIG. 8, an embodiment of this application further provides a communication apparatus 800. The communication apparatus 800 includes a transceiver module 802 and a processing module 801.

In an example, the communication apparatus 800 is configured to implement a function of the terminal in the foregoing method. The communication apparatus 800 may be a terminal, or may be an apparatus in the terminal. The communication apparatus may be a chip system. In this embodiment of this application, the chip system may include a chip, or may include the chip and another discrete component.

The transceiver module 802 is configured to receive a downlink reference signal that is sent by the network device on a third beam. The processing module 801 is configured to perform RSRP measurement and MPE measurement on a first beam and a second beam separately.

In an example, the communication apparatus 800 is configured to implement a function of the network device in the foregoing method. The apparatus may be the network device, or may be an apparatus in the network device. The apparatus may be a chip system. In this embodiment of this application, the chip system may include a chip, or may include the chip and another discrete component.

The transceiver module 802 is configured to: send the downlink reference signal to a terminal on the third beam, and receive power measurement results of the first beam and the second beam from the terminal. The processing module 801 is configured to determine an uplink working beam of the terminal based on the power measurement result.

For specific execution processes of the processing module 801 and the transceiver module 802, refer to the descriptions in the foregoing method embodiment. Division into modules in embodiments of this application is an example, and is merely logical function division. During actual implementation, there may be another division manner. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 9:
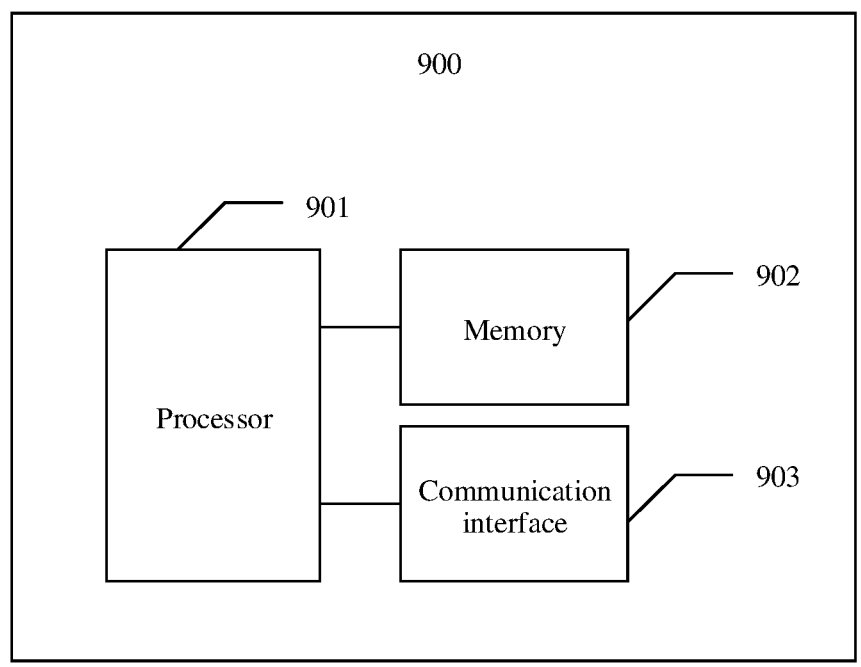
FIG. 9 is a schematic diagram of a structure of another communication apparatus according to an embodiment of this application.

Same as the foregoing idea, as shown in FIG. 9, an embodiment of this application further provides a communication apparatus 900.

In an example, the communication apparatus 900 is configured to implement a function of the terminal in the foregoing method. The communication apparatus 900 may be a terminal, or may be an apparatus in the terminal. The communication apparatus 900 includes at least one processor 901, configured to implement a function of the terminal in the foregoing methods. For example, the processor 901 may be configured to: when a difference between first RSRP and first back-off power is greater than a difference between second RSRP and second back-off power, select a first beam from the first beam and a second beam, as an uplink working beam. For details, refer to detailed descriptions in the method. Details are not described herein again.

In some embodiments, the communication apparatus 900 may further include at least one memory 902, configured to store program instructions and/or data. The memory 902 is coupled to the processor 901. Coupling in this embodiment of this application is indirect coupling or a communication connection between apparatuses, units, or modules, may be in an electrical form, a mechanical form, or another form, and is used for information exchange between apparatuses, units, or modules. In another implementation, the memory 902 may alternatively be located outside the communication apparatus 900. The processor 901 may cooperate with the memory 902. The processor 901 may execute the program instructions stored in the memory 902. At least one of the at least one memory may be included in the processor.

In some embodiments, the communication apparatus 900 may further include a communication interface 903, configured to communicate with another device through a transmission medium, so that an apparatus in the communication apparatus 900 may communicate with the another device. For example, the communication interface 903 may be a transceiver, a circuit, a bus, a module, or another type of communication interface, and the another device may be a network device, another terminal device, or the like. The processor 901 receives and sends data through the communication interface 903, and is configured to implement the methods in the foregoing embodiments. For example, the communication interface 903 may be configured to receive a downlink reference signal from a third beam of a network device on the first beam and the second beam.

In an example, the communication apparatus 900 is configured to implement a function of the network device in the foregoing method. The communication apparatus 900 may be a network device, or may be an apparatus in the network device. The communication apparatus 900 includes at least one processor 901, configured to implement a function of the network device in the foregoing methods. For example, the processor 901 may be configured to trigger sending of a downlink reference signal or the like to the terminal on the third beam. For details, refer to detailed descriptions in the method. Details are not described herein again.

In some embodiments, the communication apparatus 900 may further include at least one memory 902, configured to store program instructions and/or data. The memory 902 is coupled to the processor 901. Coupling in this embodiment of this application is indirect coupling or a communication connection between apparatuses, units, or modules, may be in an electrical form, a mechanical form, or another form, and is used for information exchange between apparatuses, units, or modules. In another implementation, the memory 902 may alternatively be located outside the communication apparatus 900. The processor 901 may cooperate with the memory 902. The processor 901 may execute the program instructions stored in the memory 902. At least one of the at least one memory may be included in the processor.

In some embodiments, the communication apparatus 900 may further include a communication interface 903, configured to communicate with another device through a transmission medium, so that an apparatus in the communication apparatus 900 may communicate with the another device. For example, the communication interface 903 may be a transceiver, a circuit, a bus, a module, or another type of communication interface, and the another device may be a network device, another terminal device, or the like. The processor 901 receives and sends data through the communication interface 903, and is configured to implement the methods in the foregoing embodiments. For example, the communication interface 903 may send a downlink reference signal or the like.

In this embodiment of this application, a connection medium among the communication interface 903, the processor 901, and the memory 902 is not limited. For example, in this embodiment of this application, the memory 902, the processor 901, and the communication interface 903 may be connected through a bus in FIG. 9. The bus may be classified into an address bus, a data bus, a control bus, or the like.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the methods disclosed with reference to embodiments of this application may be directly performed and completed by a hardware processor, or may be performed and completed by using a combination of hardware and software modules in the processor.

In embodiments of this application, the memory may be a nonvolatile memory, such as a hard disk drive (hard disk drive, HDD) or a solid-state drive (solid-state drive, SSD), or may be a volatile memory (volatile memory), such as a random-access memory (random-access memory, RAM). The memory is any other medium that can carry or store expected program code in a form of an instruction structure or a data structure and that can be accessed by a computer, but is not limited thereto. The memory in embodiments of this application may alternatively be a circuit or any other apparatus that can implement a storage function, and is configured to store program instructions and/or data.

All or a part of the methods in embodiments of this application may be implemented by using software, hardware, firmware, or any combination thereof. When the software program is used to implement the embodiments, all or some of the embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A method, wherein the method comprises:
   receiving, by a terminal on a first beam and a second beam, a downlink reference signal from a third beam of a network device;
   performing, by the terminal, reference signal receiving power (RSRP) measurement on the first beam to obtain first RSRP, and performing RSRP measurement on the second beam to obtain second RSRP, wherein the first RSRP is receiving power at which the terminal receives the downlink reference signal from the third beam using the first beam, and the second RSRP is receiving power at which the terminal receives the downlink reference signal from the third beam using the second beam;
   performing, by the terminal, maximum permissible exposure (MPE) measurement on the first beam to obtain first back-off power, and performing MPE measurement on the second beam to obtain second back-off power; and
   when a difference between the first RSRP and the first back-off power is greater than a difference between the second RSRP and the first back-off power, sending, by the terminal, uplink data using the first beam.

2. The method according to claim 1, wherein when the difference between the first RSRP and the first back-off power is greater than the difference between the second RSRP and the first back-off power, a downlink working beam is the first beam.

3. The method according to claim 1, wherein the method further comprises:
   when the first RSRP is less than the second RSRP, selecting, by the terminal, the second beam from the first beam and the second beam, as a downlink working beam.

4. The method according to claim 1, wherein performing, by the terminal, the MPE measurement on the first beam to obtain the first back-off power comprises:
   measuring, by the terminal, a distance between the first beam and a human body of a user of the terminal, and determining the first back-off power based on the distance between the first beam and the human body and uplink transmit power at which the terminal sends an uplink signal using the first beam, wherein the first back-off power is back-off power that corresponds to the distance between the first beam and the human body and the uplink transmit power.

5. The method according to claim 1, wherein the method further comprises:
   reporting, by the terminal, power measurement results of the first beam and the second beam to the network device, wherein the power measurement results of the first beam and the second beam comprise the first RSRP, the second RSRP, the first back-off power, and the second back-off power, or the power measurement results of the first beam and the second beam comprise the difference between the first RSRP and the first back-off power, and a difference between the second RSRP and the second back-off power.

6. The method according to claim 5, wherein the method further comprises:
   receiving, by the terminal, a beam adjustment notification from the network device, wherein the beam adjustment notification comprises an uplink working beam; and
   before sending, by the terminal, the uplink data using the first beam, the method further comprises:
   selecting, by the terminal, the first beam from the first beam and the second beam based on the beam adjustment notification, as the uplink working beam.

7. A method comprising:
   sending, by a network device, a downlink reference signal on a third beam;
   receiving, by the network device, power measurement results that are of a first beam and a second beam of a terminal and that are reported by the terminal, wherein the power measurement results of the first beam and the second beam comprise first reference signal receiving power (RSRP), second RSRP, first back-off power, and second back-off power, or the power measurement results of the first beam and the second beam comprise a difference between the first RSRP and the first back-off power and a difference between the second RSRP and the second back-off power; wherein
   the first RSRP is receiving power at which the terminal receives the downlink reference signal from the third beam using the first beam, the second RSRP is receiving power at which the terminal receives the downlink reference signal from the third beam using the second beam;
   when the difference between the first RSRP and the first back-off power is greater than a difference between the second RSRP and the first back-off power, determining, by the network device, that an uplink working beam of the terminal is the first beam; and
   sending, by the network device, a beam adjustment notification to the terminal, wherein the beam adjustment notification comprises the uplink working beam.

8. The method according to claim 7, wherein when the difference between the first RSRP and the first back-off power is greater than the difference between the second RSRP and the first back-off power, a downlink working beam of the terminal is the first beam.

9. The method according to claim 7, wherein the method further comprises:
   when the first RSRP is less than the second RSRP, determining, by the network device, that a downlink working beam of the terminal is the second beam.

10. A communication apparatus, wherein the communication apparatus comprises a transceiver and a processor, wherein
the transceiver is configured to receive, on a first beam and a second beam, a downlink reference signal from a third beam of a network device;
the processor is configured to: perform reference signal receiving power (RSRP) measurement on the first beam to obtain first RSRP, and perform RSRP measurement on the second beam to obtain second RSRP, and perform maximum permissible exposure (MPE) measurement on the first beam to obtain first back-off power, and perform MPE measurement on the second beam to obtain second back-off power; and
the transceiver is further configured to: when a difference between the first RSRP and the first back-off power is greater than a difference between the second RSRP and the first back-off power, send uplink data using the first beam; and wherein
the first RSRP is receiving power at which the apparatus receives the downlink reference signal from the third beam using the first beam, the second RSRP is receiving power at which the apparatus receives the downlink reference signal from the third beam using the second beam.

11. The communication apparatus according to claim 10, wherein when the difference between the first RSRP and the first back-off power is greater than the difference between the second RSRP and the first back-off power, a downlink working beam is the first beam.

12. The communication apparatus according to claim 10, wherein the processor is further configured to:
when the first RSRP is less than the second RSRP, select the second beam from the first beam and the second beam, as a downlink working beam.

13. The communication apparatus according to claim 10, wherein the processor is further configured to:
measure a distance between the first beam and a human body of a user of the apparatus, and determine the first back-off power based on the distance between the first beam and the human body and uplink transmit power at which the apparatus sends an uplink signal using the first beam, wherein the first back-off power is back-off power that corresponds to the distance between the first beam and the human body and the uplink transmit power.

14. The communication apparatus according to claim 10, wherein the transceiver is further configured to:
report power measurement results of the first beam and the second beam to the network device, wherein the power measurement results of the first beam and the second beam comprise the first RSRP, the second RSRP, the first back-off power, and the second back-off power, or the power measurement results of the first beam and the second beam comprise the difference between the first RSRP and the first back-off power, and a difference between the second RSRP and the second back-off power.

15. The communication apparatus according to claim 14, wherein the transceiver is further configured to:
receive a beam adjustment notification from the network device, wherein the beam adjustment notification comprises an uplink working beam; and
the processor is further configured to select the first beam from the first beam and the second beam based on the beam adjustment notification, as the uplink working beam.

* * * * *